2 Sheets—Sheet 1.

C. H. McCORMICK.

REAPING MACHINE.

No. 818.

Reissued Sept. 20, 1859.

2 Sheets—Sheet 2.
C. H. McCORMICK.
REAPING MACHINE.
No. 818.
Reissued Sept. 20, 1859.
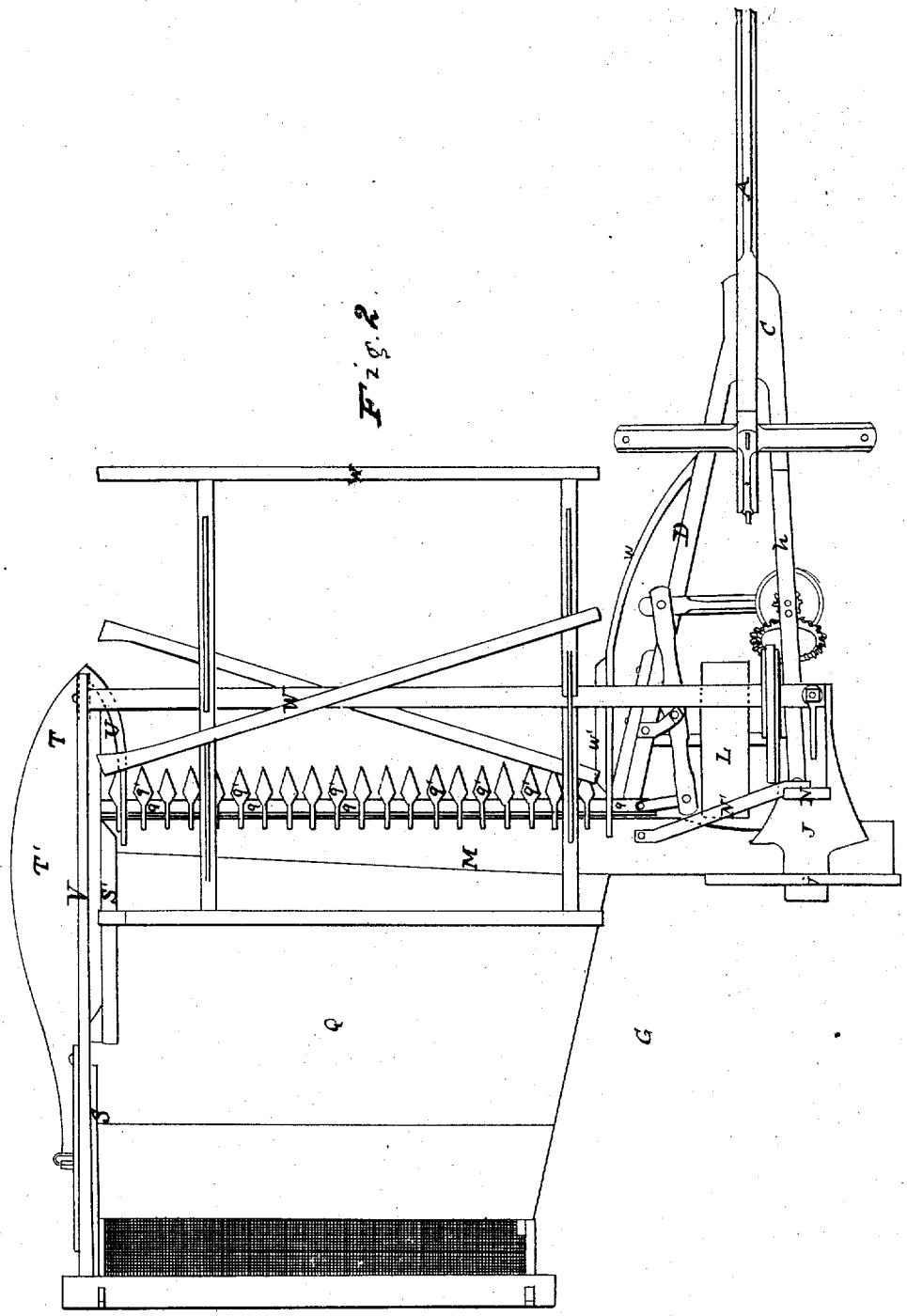

UNITED STATES PATENT OFFICE.

CYRUS H. McCORMICK, OF CHICAGO, ILLINOIS.

IMPROVEMENT IN REAPING-MACHINES.

Specification forming part of Letters Patent No. 5,335, dated October 23, 1847; Reissue No. 239, dated May 24, 1853; Reissue No. 637, dated December 21, 1858; Reissue No. 818, dated September 20, 1858.

*To all whom it may concern:*

Be it known that I, CYRUS H. MCCORMICK, of Chicago, in the county of Cook and State of Illinois, have invented a new and useful Improvement in Reaping-Machines, of which the following is a full, clear, and exact description, reference being had to the accompanying drawings, making part of this specification, in which—

Figure 1:
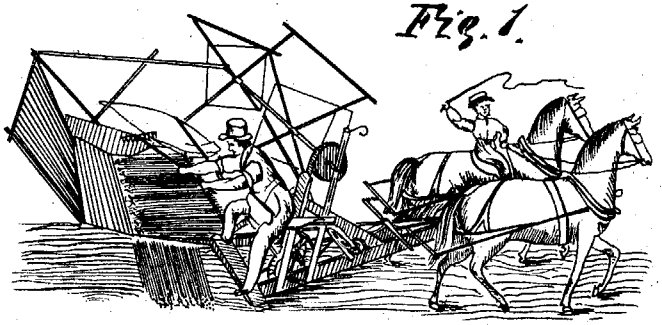
Figure 3:
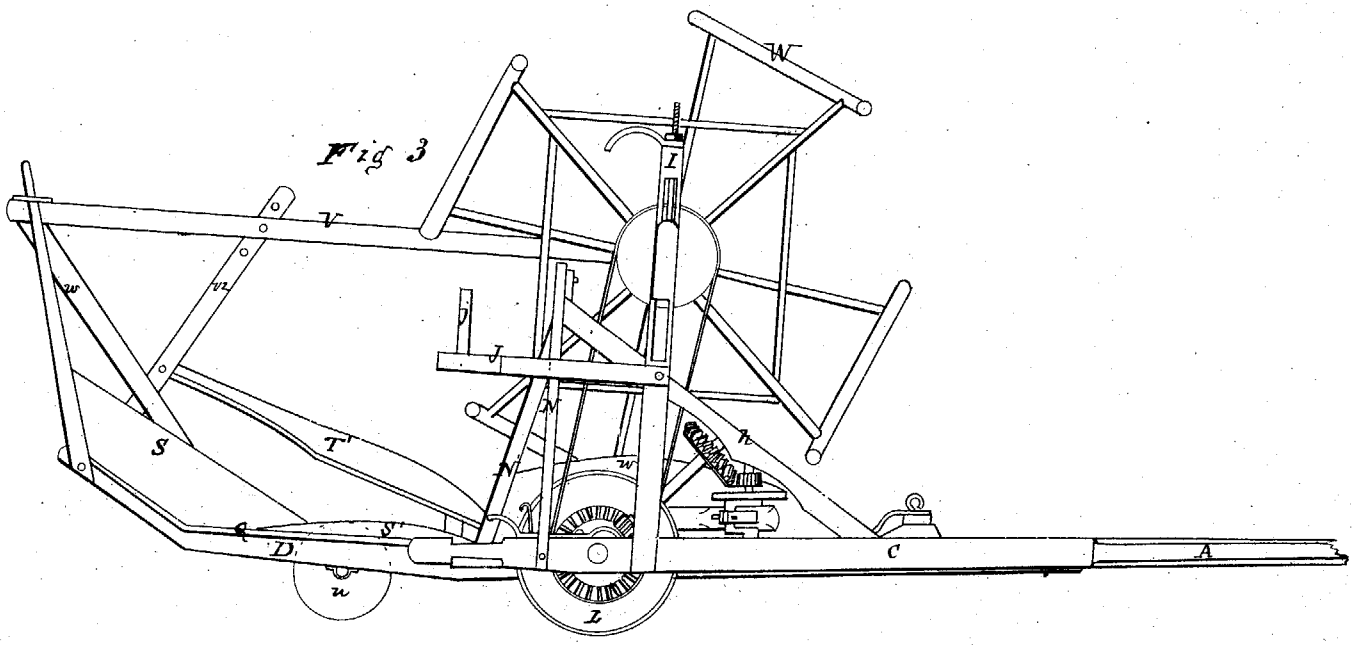

Figure 1 represents in perspective a side-draft reel reaping-machine embracing my said improvement. Fig. 2 represents a plan of such a machine as seen from above, and Fig. 3 represents an elevation of the inner side of the machine.

That side of the machine to which the horses are attached, and which runs next the stubble, I call the "inner side," and the opposite side of the machine, which runs next the uncut grain, I call the "outer side," of the machine.

In the long course of my labors in improving the side-draft reel reaping-machine I discovered that it was important that a raker's seat or stand on the machine should be so constructed as to give support to the raker both in front and laterally, while either sitting or standing, so as to enable him, whether standing or sitting, to preserve his balance and conveniently to do his work. Such a support for the raker I have contrived; and it consists in a place for him to stand or sit with such lateral and forward supports that he may, without endangering his stability, lean forward or sidewise, or assume any attitude necessary or convenient for the performance of his work without danger of being thrown out of his place or of having his work interrupted by the jolting of the machine.

In the drawings I have shown this improvement applied to a McCormick reaping-machine, but deem it unnecessary to describe in detail any more of that machine than is useful to a proper understanding of this improvement.

In the accompanying drawings, M represents a strong beam, called the "finger-piece" or "finger-beam," forming the front of the platform Q, on the outer portion of the forward side of which the cutting apparatus is placed.

The finger piece or beam is attached at the inner end to the rear ends of two oblique bounds or beams, C and D, which approach each other at their front ends, where they are bolted to the rear end of a tongue, A, by which the machine is drawn.

The driving-wheel L and the gearing for transmitting motion from it to the cutter and reel are arranged in the space between the bounds C and D, and the platform Q is placed in rear of the cutter.

The raker occupies a stand fixed on the frame and fitted with a seat or rest, J, to be straddled by the raker, so that he can either sit or stand with the seat between his legs to steady him laterally when at work. This seat or rest J is attached to a standard, N, which rises from the frame, and is supported by braces *h* and N′.

In front of the raker there is a bar or cross-rest, *j*, against which the raker can lean, and which will give him support when leaning forward to get at the grain without impeding the use of his arms or body. From the rest the raker can while riding upon the machine, conveniently and securely reach the grain on the platform Q with his discharging-instrument and sweep it off at intervals in quantities suitable for a gavel.

What I claim under this patent as my invention is—

A seat or stand on the reaping-machine for the support of the raker laterally and in front, substantially as described.

In testimony whereof I have hereunto signed my name.

C. H. MCCORMICK.

In presence of—

P. H. WATSON,

JOHN S. HOLLINGSHEAD.